(No Model.)
W. D. P. AIMS, Jr.
FILTER.
No. 512,931. Patented Jan. 16, 1894.
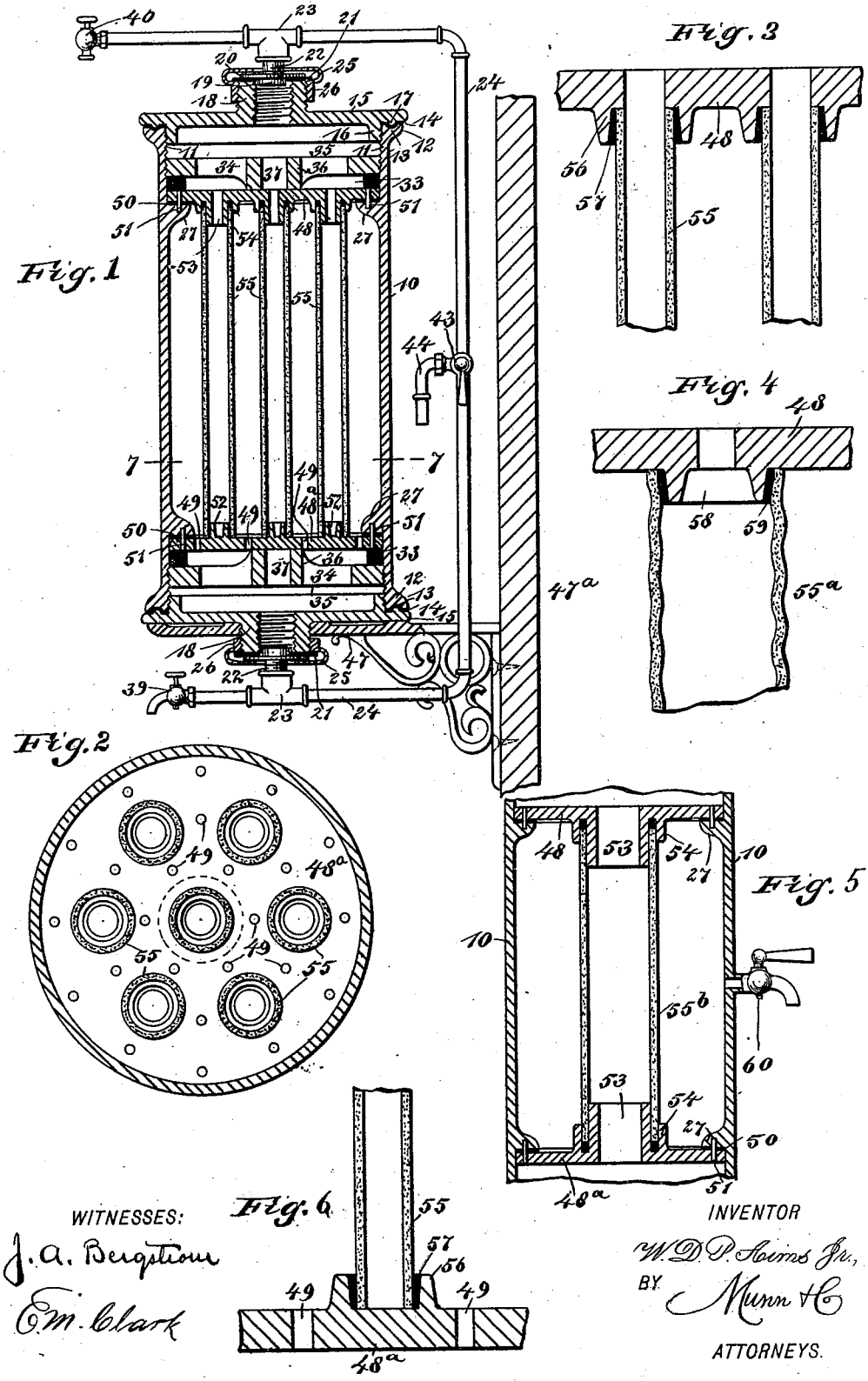
WITNESSES:
J. A. Bergstrom
C. M. Clark
INVENTOR
W. D. P. Aims Jr.,
BY Munn & Co
ATTORNEYS.

UNITED STATES PATENT OFFICE.

WILLIAM D. P. AIMS, JR., OF PHILADELPHIA, PENNSYLVANIA.

FILTER.

SPECIFICATION forming part of Letters Patent No. 512,931, dated January 16, 1894.

Application filed August 20, 1892. Serial No. 443,580. (No model.)

*To all whom it may concern:*

Be it known that I, WILLIAM D. P. AIMS, Jr., of Philadelphia, in the county of Philadelphia and State of Pennsylvania, have invented a new and Improved Filter, of which the following is a full, clear, and exact description.

My invention relates to improvements in filters adapted for use in filtering water, oil, or any other liquid, and for general domestic and manufacturing purposes; the object of my invention being to produce a simple and efficient filter, which may be easily constructed, easily applied, and which may be thoroughly cleaned without taking it apart or removing it from its position on the water pipe.

To this end my invention consists in certain features of construction and combinations of the same, as will be described hereinafter and then pointed out in the claims.

Reference is to be had to the accompanying drawings, forming a part of this specification, in which similar figures of reference indicate corresponding parts in all the views.

Figure 1 is a central vertical section of the tubular filter showing it supported upon a bracket affixed to a wall. Fig. 2 is a horizontal section on line 7—7 of Fig. 1. Fig. 3 is a detail sectional view showing a connection between the tubes and one of the supporting plates. Fig. 4 is a similar view of the modified form of tube and plate connection, showing also a modified form of the tube itself. Fig. 5 is a central section (broken) of a modified form of tubular filter. Fig. 6 is a detail sectional view, on an enlarged scale, showing the connection between one of the bottom plates and one of the filtering tubes.

The filter is provided with a cylindrical case 10, which is internally screw threaded at the ends, as shown at 11, and which terminates at both ends in flanges 12, in the end faces of which are produced annular grooves 13, these being adapted to receive a portion of the packing washers 14, which are placed upon the ends of the case, and which are held snugly by the caps 15, which cover the ends of the case, these caps having threaded flanges 16, which screw into the threaded ends 11 of the body and have annular ribs 17, adapted to impinge upon the washers 14 and crowd the same snugly into the grooves 13, thus making a perfectly tight joint.

The caps 15 have central nipples 18, which are internally and externally screw threaded and through which the water passes in and out of the filter. The nipples 18 are adapted to receive castings 19, having a central bore, these castings having also base flanges 20, which are adapted to rest upon a washer 21, held between them and the ends of the nipple, and the castings have projecting reduced screw threaded nipples 22, which are adapted to connect with couplings 23 on the water pipe 24, the arrangement of which will be hereinafter described. The castings 19 are held in place by caps 25, which have central openings to receive the nipples 22 and which have internally threaded cylindrical portions 26, adapted to screw upon the exterior of the nipples 18. It will be seen that a joint is thus effected and a convenient coupling made between the nipples 18 and the water pipe 24.

The body or case 10 has within it and near the ends annular shoulders 27, for holding the rigid diaphragms or plates 48 and 48$^a$. The lower plate 48$^a$ has numerous perforations for passage of water. If, however, the water is admitted to the top of the filter, the passages are produced in the top plate instead of the bottom plate.

A packing washer 50, is arranged between the diaphragms or plates 48 and 48$^a$, and the flanges 27 and the diaphragms are further held in position by pins 51, which are secured to the flanges and which enter holes in the diaphragms. The lower plate 48$^a$ has closed washer nipples 52 on its upper side and the upper plate has, on its under side, concentric rings 53 and 54, the latter or inner rings being longer than the outer ones and having a central bore leading through the plate. These rings or nipples are adapted to support porous filtering tubes 55 which extend longitudinally through the central portion of the case, the tubes at their lower ends being slipped over the nipples or rings 52 and having their upper ends held between the concentric rings or nipples 53 and 54. The rings are held tightly in place, and to insure a perfect joint, a packing washer is arranged between the rings or nipples 53 and 54, so that the ends of the tubes will impinge upon it.

The packing washers 33 are arranged outside the diaphragms or plates 48 and 48ª, these being held in place by the nuts 34, and having their thickened portions 36 bearing upon the center of the diaphragms or plates, so as to strengthen them. These rings or nipples on the diaphragms or plates may be arranged in many ways to form a tight joint, and several ways are shown in Figs. 3 to 6. In Fig. 3 the diaphragm or plate 48 has on its under side projecting rings or nipples 56 which receive the ends of the tubes 55, and a packing ring or washer 57 is arranged between the tubes and the nipples.

Fig. 4 shows a nipple 58 arranged within the tube 55ª and a packing ring 59 arranged between the ring and tube. The tube 55ª, as shown in Fig. 4, is fluted so as to give it additional strength, and the flutings or corrugations may be made to run lengthwise or spirally upon the tube as desired.

Fig. 6 shows, at the bottom, a plate 48ª arranged substantially like the top plate in Fig. 3, the inclosing nipple and ring 56 and 57 being arranged around the end of the tube 55.

Fig. 5 shows a modified form of filter having a single central porous tube 55ᵇ which may be connected with the plates 48 and 48ª in either of the ways above described, but the plates are not perforated and unfiltered water is admitted to the tube 55ᵇ from both ends. It will thus pass through the porous wall of the tube, filling the case 10, from which it may be withdrawn through the faucet 60.

The water-pipe, 24, which connects with the filter, is bent so as to extend opposite the upper and lower ends of the filter and also up one side of the same. This pipe has a wastecock 39, at its lower end, and a valve 40 at the upper end through which water may be drawn. The pipe, 24, has at a point opposite the body portion of the filter, a three-way valve, 43, which also connects with an outlet spout, 44, to which a hose or supply pipe can be attached. This cock may be arranged so as to shut the water out entirely, or send it through the pipe, 24, so as to enter either the top or bottom of the filter. Water is admitted at the lower end of the case when the parts are arranged as shown in Fig. 1, and it passes through the perforations 49 through the porous walls of the tube 55 and up and out through the top of the filter, but it will be understood that the filter may be arranged so as to have the water enter at either end.

Having thus described my invention, I claim as new and desire to secure by Letters Patent—

1. In a filter, the combination, with the casing having an internal screw-thread and shoulder, the nippled and perforated diaphragm resting on the latter, and means for locking it to prevent rotation, and the tubes 55, of the disk-like lock-nut having openings, as specified, and a central portion that projects below its threaded, peripheral portion and bears upon the diaphragm, as and for the purpose specified.

2. The combination, with the case, having internal shoulders, a perforated diaphragm having perforated nipples, an opposite diaphragm having imperforate nipples, and passages, or openings, arranged between them, and porous tubes whose ends are fitted on said nipples, as shown and described.

WM. D. P. AIMS, JR.

Witnesses:
WM. D. P. AIMS,
JACOB RALPH AIMS.